2,870,161

2-(1-INDANYL AMINO)-OXAZOLINES

Barry M. Bloom, Jackson Heights, N. Y., assignor to Chas. Pfizer & Co., New York, N. Y., a corporation of Delaware No Drawing. Application July 8, 1957
Serial No. 670,373

6 Claims. (Cl. 260—307)

This application is concerned with new and useful therapeutic agents. In particular, it is concerned with compounds which are effective regulators of the central nervous system, being especially useful as tranquilizing agents.

The compounds of this invention are substituted and unsubstituted 2-(1-indanylamino)-oxazolines, their pharmaceutically acceptable acid addition salts and N-(1-indanyl)-N'-(β-substituted ethyl)-ureas. The latter compounds are not only intermediates for the preparation of oxazolines but are also useful themselves as regulators of the central nervous system.

The N-(1-indanyl)-N'-(β-substituted ethyl)-ureas are prepared by the reaction between a 1-indanylamine and an alkyl isocyanate with certain substituents to be recited hereinafter in a position β to the isocyanate group. Alternatively, the products are prepared by the reaction between a 1-indanyl isocyanate and an alkylamine with similar substituents in a position β to the amine group. Thus it is possible to prepare N-(1-indanyl)-N'-β-bromoethyl urea by the reaction between 1-indanylamine and β-bromoethyl isocyanate or by the reaction between 1-indanyl isocyanate and β-bromoethlamine. In either case 2-(1-indanylamino)-oxazoline is prepared from the urea by the elimination of hydrogen bromide. The reactions are shown below.

(1)

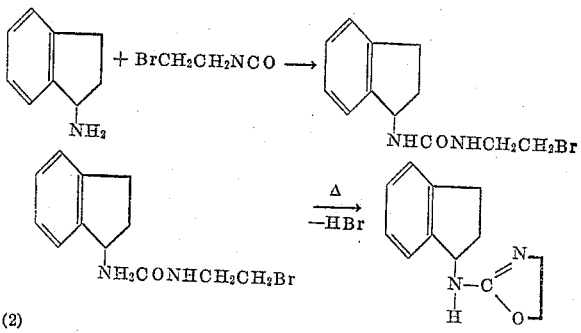

(2)

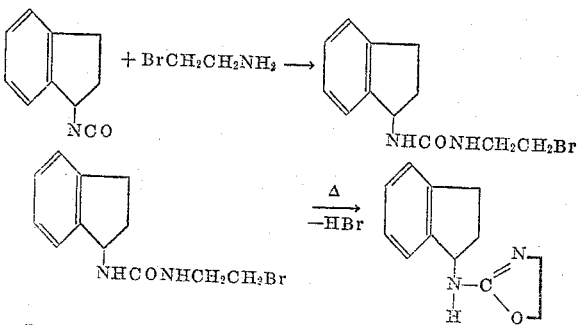

In the reaction shown above, the β-substituted alkylamine and isocyanate are bromoethyl compounds and the oxazoline prepared is unsubstituted on both of the methylene groups. By choice of the proper amine or isocyanate it is possible to prepare oxazolines with one of both of the methylene groups either monosubstituted or disubstituted. It is, therefore, also intended to include within the purview of this invention oxazolines in which either or both of the methylene groups are substituted with at least one alkyl group containing up to four carbon atoms, the total number of carbon atoms in these substituents being from one to eight. As an example of the preparation of this type of compound, 2-(1-indanylamino)-5-ethyl-oxazoline can be prepared by reacting 1-indanylamine with β-bromobutyl isocyanate and subsequently heating.

For the preparation of the active urea compounds of this invention, the bromine of the above reaction may be replaced with other halogens such as chlorine or iodine, or with alkyl or aryl sulfonyl groups such as methanesulfonyloxy or p-toluenesulfonyloxy. In these cases, the active oxazoline is formed by the elimination of hydrogen chloride, hydrogen iodide, methanesulfonic acid and p-toluenesulfonic acid respectively. Since the amino-oxazolines are basic in nature the liberated acid, which has been eliminated from the urea compound, adds to it to form an acid addition salt. The free base may be liberated from the acid addition salt using an alkaline reagent such as ammonium hydroxide, sodium hydroxide, sodium bicarbonate, calcium oxide and other obvious equivalents.

The hydrogen atoms of the indanyl group in the above reactions may be replaced with certain substituents to reduce or enhance the therapeutic effect of the unsubstituted compounds. These substituents include from one to three alkyl groups, alkoxy groups and thioalkyl groups containing up to four carbon atoms, as well as from one to three chlorine, bromine or iodine atoms.

The α and β carbon atoms of the ethyl portion of the N-(1-indanyl)-N'-(β-substituted ethyl)-ureas which are themselves therapeutically active and can also be used for the preparation of the active oxazolines of the present invention may be substituted with alkyl groups containing from one to four carbon atoms, the total number of substituent carbon atoms being from one to eight. The compound which will give 2-(1-indanylamino)-4,4,5,5-tetraethyloxazoline is N-(1-indanyl)-N'-(α,α,β,β-tetraethyl-β-halo)-ethyl urea. Similarly, N-(1-indanyl)-N'-(α,α-dibutyl-β-halo)-ethyl urea and N-(1-indanyl)-N'-(α,β-dibutyl-β-halo)-ethyl urea will yield respectively 2-(1-indanylamino)-4,4-dibutyl oxazoline and 2-(1-indanyl-amino)-4,5-dibutyl oxazoline.

The following list is illustrative of compounds of this invention.

N-(1-indanyl)-N'-β-chloroethyl urea
N-(4-chloro-1-indanyl)-N'-β-(p-toluenesulfonyloxy)-ethyl urea
N-(2,4-diiodo-1-indanyl)-N'-β-iodoethyl urea
N-(2,3-dibromo-1-indanyl) - N' - (α-butyl-β-methanesulfonyloxy)-ethyl urea
N-(2,4,5-trichloro-1-indanyl) - N' - (α-n-propyl-β-chloro)-ethyl urea
N-(2-ethyl-1-indanyl)-N'-β-bromoethyl urea
N-(1-indanyl)-N'-(α,α-dimethyl)-β-bromoethyl urea
N-(2,3-diethyl-1-indanyl)-N'-β-iodoethyl urea
N-(2-n-butoxy-1-indanyl) - N' - β - methanesulfonyloxy-ethyl urea
N-(2,5-dimethoxy-1-indanyl) - N' - (α-methyl-β-p-toluenesulfonyloxy)-ethyl urea
N-(2,3,5-trichloro-1-indanyl)-N'-β-bromoethyl urea
N-(2,3-dithiopropyl-1-indanyl)-N'-β-bromoethyl urea
N-(2,5-dithiomethyl-1-indanyl)-N'-(α-methyl - β-butyl-β-iodo)-ethyl urea
N-(3,4-diethoxy-1-indanyl)-N'-β-chloroethyl urea
2-(2,3-dichloro-1-indanylamino)-oxazoline
2-(2-bromo-1-indanylamino)-4-methyl-oxazoline 2-(4-ethyl-1-indanylamino)-3,4-dimethyl-oxazoline
2-(2,3,5-triiodo-1-indanylamino)-oxazoline
2-(3,4-dithiomethyl-1-indanylamino)-4-n-butyl-oxazoline
2 - (2,3,5 - tri - sec - butoxy - 1 - indanylamino) - 4,5-diethyl-oxazoline
2-(4-thio-tert-butyl-1-indanylamino)-oxazoline
2-(2,3,5-trimethyl-1-indanylamino)-oxazoline
2-(2,3,5-trithiomethyl-1-indanylamino)-oxazoline
2-(2,7-diethoxy-1-indanylamino)-4,5-dimethyl-oxazoline
2-(4-thioisopropyl-1-indanylamino)-5-ethyl-oxazoline The amines and isocyanates necessary for the preparation of the compounds of this invention are known, or can be prepared, by procedures well known in the art. The alkyl isocyanates, for example, are prepared by treatment of the corresponding acid chlorides with sodium azide. The alkylamines can be prepared utilizing the Hofmann on the corresponding amides. The 1-indanylamines can be prepared from the corresponding 1-indanones by conversion of the latter compounds to oximes and reduction, for example, with lithium aluminum hydride. If it should be desired to prepare a 1-indanyl isocyanate, this can be accomplished by treating the amine with phosgene and warming the resulting carbamyl chloride to eliminate hydrogen chloride.

In carrying out the reaction the isocyanate and amine are contacted in benzene or in an equivalent aromatic solvent. Hydrocarbon solvents, both aromatic and aliphatic can be used. Halogenated and nitrated hydrocarbon solvents are also useful. There may be mentioned by way of example, chloroform, carbon tetrachloride, ethylene dichloride, chlorobenzene, toluene, xylene, nitrobenzene and nitrotoluene. Lower oxygenated aliphatic solvents, particularly ethers containing up to eight carbon atoms are particularly useful.

The reaction between an amine and an isocyanate generally takes place without the application of heat. In fact, with some of the more reactive compounds, it is best to carry out the reaction in an ice bath. However, as in other reactions of this type, the progress of the reaction may be hastened by the use of heat. With certain of the more inactive reactants, it may even be necessary to apply heat. It has been found that temperatures from 0° to 110° C. are useful and that most of the amines and isocyanates react to form products of this invention below 50° C.

Formation of an oxazoline acid addition salt by the elimination of an acid from the urea compound is best carried out in refluxing aqueous solution although lower alkanols such as methanol, ethanol, propanol or butanol may be used.

Although both reactions of the synthesis proceed readily at atmospheric pressure, for certain applications it may be desirable to use increased pressure. Pressures as high as 100 atmospheres may be useful.

The compounds of this invention are useful as central nervous system depressants and when administered to rodents, it is found that they significantly reduce the spontaneous motility of these animals. Similar results are observed with monkeys and other higher animals.

It is a most unexpected finding in view of the aliphatic nature of the 1-indanyl group to discover that ureas and aminooxazolines substituted with these groups have central nervous system regulatory activity. Copending patent application, Serial No. 587,224, filed May 25, 1956, now Patent No. 2,811,529 described certain naphthyl ureas and naphthylaminooxazolines which have this type of activity. It should be noted that the naphthyl ring described in said copending application is a fully aromatic ring and, therefore, the groups attached to the ring should manifest chemical and physiological reactions associated with aromaticity. On the other hand, substituents attached to the 1-position of 1-indanyl groups should manifest chemical and physiological reactions associated with aliphatic activity. It is well known that benzyl substituted ureas and oxazolines do not have central nervous system regulatory action despite the fact that, as in the 1-indanyl compounds of the present invention, groups attached to the methylene moiety are aliphatic in nature. It is apparent then that it is most unexpected, and certainly not predictable, to find that the aliphatic compounds of the instant invention have activity similar to the aromatic compounds of the prior invention especially when it is known that other aliphatic analogs do not have this activity.

Each of the types of compounds of this invention has its own specific advantages. For example, although both the ureas and the oxazolines are effective therapeutically, the oxazolines produce their effect in a shorter time. On the other hand, the ureas, while they require a somewhat longer time to take their effect, are less toxic and can, therefore, be administered in larger dosages. This suggests that under certain circumstances it may be advantageous to administer both agents simultaneously to produce both a rapid and a prolonged therapeutic action.

The ureas are neutral and do not form the acid addition salts. The oxazolines, however, are weakly basic and do form acid addition salts. These salts because of their water solubility, are more readily utilizable for the preparation of aqueous parenteral solutions than are the free bases.

With reference to the oxazolines of this invention, it is specifically intended to include within the purview of the invention the acid addition salts which these compounds form with acids having pharmaceutically acceptable anions. The term, "pharmaceutically acceptable anion" has a definite meaning to one skilled in the art. It is defined as a non-toxic anion of any of the simple acids commercially used therapeutically to neutralize basic medicinal agents when the salt thereof is to be administered to a human host. These acids include, for example, hydrochloric, hydrobromic, hydriodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydriodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA-400." This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate resin can be recovered from the eluate by a number of methods such as evaporation or solvent precipitation. This same procedure can be used to prepare nitrates, sulfates, acetates and other acid addition salts.

The agents of this invention may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for the use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The compounds of this invention are central nervous system regulators and are useful in the same manner as other regulators of the central nervous system. The dosage is generally of the same order of magnitude as the dosage required with other therapeutic agents of this type.

In certain instances it may be found that because of their high order of activity the optimum dosage of the compounds of this invention will be lower than the optimum dosage of other compounds generally recommended for the same use. In general, the physician or veterinarian will determine the dosage which will be most suitable for a particular application, and as might be expected, it will vary with the particular drug chosen and with the desired effect. It will vary with the age, weight and general health of the patient under treatment and with various other factors which will be determined by the physician or veterinarian in attendance. When the drugs are administered orally a larger quantity will be required to produce the same effect as a smaller quantity given parenterally. It has been found that parenteral administration of from 0.5 mg. to 250 mg. of active agent generally gives the desired effect.

The compositions of this invention may take a variety of forms. Various diluents may be employed and the percentage of active ingredients may be varied. It is necessary that an active ingredient form a proportion of the composition such that a suitable dosage form will be obtained. Obviously compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice versa.

The following examples are given solely for the purpose of illustration and are not to be construed as limitations of this invention, many variations of which are possible without departing from the spirit or scope thereof.

EXAMPLE I

N-(1-indanyl)-N'-β-bromoethyl urea

A solution of 0.05 mole of β-bromoethyl isocyanate dissolved in 25 ml. of ether is added slowly with stirring to an ether solution of 0.05 mole of 1-indanylamine under anhydrous conditions while cooling in an ice bath. Crystallization begins during the addition of the isocyanate and continues while the solution stands for one hour. The suspension is filtered to obtain the desired product.

EXAMPLE II 2-(1-indanylamino)-oxazoline

One liter (1 l.) of water is brought to boiling and 15 g. of N-(1-indanyl)-N'-β-bromoethyl urea is added. At the end of fifteen minutes' reflux time all except a very small amount of material dissolves. The flask is cooled in an ice bath and the small amount of insoluble material along with an additional quantity of material which separates on cooling is removed by filtration. A 14% solution of ammonium hydroxide (30 ml.) is added slowly. The precipitate is extracted with three 250 ml. portions of chloroform and the combined extract washed with water. The organic layer is dried over anhydrous sodium sulfate, filtered and concentrated in vacuo. The residue is triturated with ether and recrystallized from isopropanol.

EXAMPLE III

N-(2-chloro-1-indanyl)-N'-β-chloroethyl urea

A solution of 0.5 of β-chloroethyl isocyanate in 50 ml. of benzene is added with stirring to a 0.4 molar solution of 2-chloro-1-indanylamine in benzene while maintaining the temperature below 50° C. Stirring is continued at this temperature for an additional twenty minutes and the solution is cooled. The product precipitates on cooling and is isolated by filtration.

EXAMPLE IV 2-(2-chloro-1-indanylamino)-oxazoline

One liter of water is brought to boiling and 15 g. of N-(2-chloro-1-indanyl)-N'-β-chloroethyl urea is added. The solution is refluxed for fifteen minutes, cooled and filtered. It is neutralized with 14% ammonium hydroxide and the precipitate which forms extracted with three 250 ml. portions of chloroform. The combined extracts are washed with water, dried over anhydrous sodium sulfate, filtered and concentrated in vacuo. The crystalline residue which forms is triturated with ether and recrystallized.

EXAMPLE V

N-(3,4-dimethyl-1-indanyl)-N'-β-chloroethyl urea

A solution of ice cold 50% potassium hydroxide (150 g.) is shaken with a suspension of 0.6 mole of chloroethylamine hydrochloride in 420 ml. of benzene. The benzene layer containing the free base is precipitated and dried over a small amount of potassium hydroxide. The drying agent is removed by filtration. To this solution an equimolar benzene solution of 3,4-dimethyl-1-indanyl isocyanate is added dropwise with cooling. The solution is allowed to stand for one hour during which time the product separates.

EXAMPLE VI 2-(3,4-dimethyl-1-indanylamino)-oxazoline

One liter of water is brought to boiling and 15 g. of N-(3,4-dimethyl-1-indanyl) - N' - β - chloroethyl urea is added. The solution is refluxed for fifteen minutes, cooled and filtered. A 10% solution of sodium hydroxide is added slowly and the precipitate which forms extracted with three 250 ml. portions of chloroform. The combined extracts are washed with water and the organic layer dried over anhydrous sodium sulfate. The solvent is concentrated in vacuo and the residue which forms is triturated with ether and recrystallized.

EXAMPLE VII

N-(2,5-diiodo-1-indanyl)-N' - β - (p-toluenesulfonyloxy)-ethyl urea

A solution of 0.25 mole of β-(p-toluenesulfonyloxy)-ethyl isocyanate in ethylene dichloride is added with stirring to an ethylene dichloride solution of an equimolar proportion of 2,5-diiodo-1-indanylamine while the temperature is maintained below 75° C. When addition is completed, the solution is allowed to cool and the desired product precipitates. It is recovered by filtration.

EXAMPLE VIII 2-(2,5-diiodo-1-indanylamino)-oxazoline

One liter of water is brought to boiling and 15 g. of N-(2,5-diiodo-1-indanyl) - N' - β - (p-toluenesulfonyloxy)-ethyl urea is added. The solution is refluxed for fifteen minutes, cooled and filtered. A 5% solution of sodium bicarbonate is added and the precipitate which forms is extracted with three 250 ml. portions of chloroform. The combined extracts are washed with water, dried over anhydrous sodium sulfate, filtered and concentrated in vacuo. The residue which forms is triturated with ether and recrystallized.

EXAMPLE IX

N-(3,5-dithiopropyl-1-indanyl)-N'-β-methyl-β-chloro-ethyl urea

A solution of ice cold 50% potassium hydroxide (150 g.) is shaken with a suspension of 0.6 mole of 3,5-dithiopropyl-1-indanylamine hydrochloride in 420 ml. of benzene. The benzene layer containing the free base is separated and dried over a small amount of potassium hydroxide. The drying agent is removed by filtration. To this solution is added dropwise with cooling, an equimolar benzene solution of β-chloropropyl isocyanate. The solution is allowed to stand for one hour during which time the product separates.

EXAMPLE X

2-(3,5-dithiopropyl-1-indanylamino)-5-methyl oxazoline

One liter of water is brought to boiling and 15 g. of N-(3,5-dithiopropyl - 1 - indanyl)-N'-chloropropyl urea is added. The solution is refluxed for fifteen minutes, cooled and filtered. It is neutralized with 10% ammonium hydroxide solution and the precipitate which forms extracted with three 250 ml. portions of chloroform. The combined extracts are washed with water, dried over anhydrous sodium sulfate, filtered and concentrated in vacuo. The crystalline residue which forms is triturated with ether and recrystallized.

EXAMPLE XI

N-(1-indanyl)-N'-β-chloroethyl urea

A solution of 1.17 g. of β-chloroethyl isocyanate dissolved in 25 ml. of ether is slowly added with stirring to an equimolar ether solution of 1-indanylamine under anhydrous conditions while cooling in an ice bath. Crystallization begins during the addition of the isocyanate and continues while the solution stands for one hour. The suspension is filtered to obtain the desired product.

EXAMPLE XII

N-(1-indanyl)-N'-β-iodoethyl urea

A solution of β-iodoethyl isocyanate dissolved in ether is slowly added with stirring to an ether solution of 1-indanylamine under anhydrous conditions while cooling in an ice bath. Crystallization begins during the addition of the isocyanate and continues while the solution stands for one hour. The suspension is filtered to obtain the desired product.

EXAMPLE XIII

N-(1-indanyl)-N'-(β-n-butyl-β-chloro)-ethyl urea

A solution of ice cold 50% potassium hydroxide (150 g.) is shaken with a suspension of 0.6 mole of 1-indanylamine hydrochloride in 420 ml. of benzene. The benzene layer containing the free base is separated and dried over a small amount of potassium hydroxide. The drying agent is removed by filtration. To this solution an equimolar benzene solution or β-chlorohexyl isocyanate is added dropwise with cooling. The solution is allowed to stand during which time the desired product separates.

EXAMPLE XIV

2-(1-indanylamino)-5-n-butyl oxazoline

One liter of water is brought to boiling and 15 g. of N-(β-n-butyl-β-chloro)-ethyl urea is added. The solution is refluxed for fifteen minutes, cooled and filtered. The solution is made basic with a 14% solution of ammonium hydroxide and the precipitate which forms extracted with three 250 ml. portions of chloroform. The combined extracts are washed with water. The organic layer is dried over anhydrous sodium sulfate, filtered and concentrated in vacuo. Crystalline residue which forms is triturated with ether and recrystallized.

EXAMPLE XV

N-(2-methyl-1-indanyl)-N'-β-methanesulfonyloxy)-ethyl urea

A solution of ice cold 50% potassium hydroxide (150 g.) is shaken with a suspension of 0.6 mole of 8-methyl-1-indanylamine hydrochloride in 420 ml. of benzene. The benzene layer containing the free base is separated and dried over a small amount of potassium hydroxide. The drying agent is removed by filtration. To this solution an equimolar benzene solution of β-(methanesulfonyloxy)-ethyl isocyanate is added dropwise with cooling. The solution is allowed to stand for one hour during which time the product precipitates.

EXAMPLE XVI

2-(2-methyl-1-indanylamino)-oxazoline

One liter of water is brought to boiling and 15 g. of N-(8-methyl - 1 - indanyl)-N'-β-(methanesulfonyloxy)-ethyl urea is added. The solution is refluxed for fifteen minutes, cooled and filtered. The solution is neutralized with 10% sodium hydroxide and the precipitate which forms extracted with three 250 ml. portions of chloroform. The combined extracts are washed with water, dried over anhydrous sodium sulfate, filtered and concentrated in vacuo. The crystalline residue which forms is triturated with ether and crystallized.

EXAMPLE XVII

2-(1-indanylamino)-oxazoline sulfate

A 15% aqueous solution of 2-(1-indanylamino)-oxazoline hydrochloride is stirred for three hours with an anion exchange resin which had been previously washed with an aqueous sulfuric acid. The resin was removed by filtration and the solvent removed in vacuo to leave the sulfuric acid addition salt as a residue.

Included among the anion exchange resins used for this process was Amberlite IRA–410 and Amberlite IRA–400 available from Rohm & Haas Company, as well as Dowex–1 and Dowex–2 available from the Dow Chemical Company.

A number of other acid addition salts are prepared using this procedure and these include the acetate, citrate, maleate, gluconate, nitrate, tartrate and phosphate.

EXAMPLE XVIII

A tablet base is prepared by blending the following ingredients in the proportion by weight indicated:

| | Grams |
|---|---|
| Sucrose, U. S. P. | 82.0 |
| Tapioca starch | 13.6 |
| Magnesium stearate | 4.4 |

Into this tablet there is blended a sufficient amount of N-(1-indanyl)-N'-(β-ethyl-β-chloro)-ethyl urea to provide tablets each containing 25 mg. of active ingredient.

EXAMPLE XIX

Into the tablet base of Example XVIII there is blended a sufficient amount of 2-(2-chloro-1-indanylamino)-oxazoline to provide tablets each containing 0.5 mg. of active ingredient.

EXAMPLE XX

A tablet base is prepared by blending the following ingredients in the proportion by weight indicated:

| | Grams |
|---|---|
| Sucrose, U. S. P. | 80.3 |
| Tapioca starch | 13.2 |
| Magnesium stearate | 6.5 |

Into this base there is blended a sufficient amount of N-(1-indanyl)-N'-β- (methanesulfonyloxy)-ethyl urea to provide tablets each containing 50 mg. of active ingredient.

EXAMPLE XXI

Into the tablet base of Example XX there is blended a sufficient amount of 2-(2-propyl-1-indanyl)-oxazoline to provide tablets each containing 1 mg. of active ingredient.

EXAMPLE XXII

An aqueous solution containing 0.005% by weight of 2-(1-indanylamino)-4-methyl oxazoline hydrobromide is prepared by dissolving the salt in U. S. P. distilled water.

EXAMPLE XXIII

Sesame oil is sterilized by heating at 120° C. for two hours. To this oil a sufficient quantity of pulverized N-(1-indanyl)-N'-β-iodo ethyl urea is added to make a 0.025% suspension by weight. The solid is thoroughly dispersed in the oil with the use of a colloid mill. It is then filtered through a 100 to 150 mesh screen and poured into sterile vials.

What is claimed is:

1. A compound selected from the group consisting of substituted and unsubstituted 2-(1-indanylamino)-oxazolines and their pharmaceutically acceptable acid addition salts wherein; (a) the substituents on a substituted indanyl ring are selected from the group consisting of one to three alkyl, alkoxy and thioalkyl groups each containing up to four carbon atoms, and one to three chlorine, bromine and iodine atoms and, (b) each substituent on a substituted methylene group of the oxazoline ring is selected from the group consisting of alkyl groups each containing one to four carbon atoms, there being a total of from one to eight carbon atoms in such substituents.

2. 2-(1-indanylamino)-oxazoline.
3. 2-(2-chloro-1-indanylamino)-oxazoline.
4. 2-(3,4-dimethyl-1-indanylamino)-oxazoline.
5. 2-(2,5-diiodo-1-indanylamino)-oxazoline.
6. 2-(3,5-dithiopropyl-1-indanylamino) - 5 - methyl oxazoline.

References Cited in the file of this patent

UNITED STATES PATENTS

| | | |
|---|---|---|
| 2,027,031 | Engelmann | Jan. 7, 1936 |
| 2,450,807 | McCarthy | Oct. 5, 1948 |
| 2,722,550 | Schollenberger | Nov. 1, 1955 |
| 2,727,042 | Jacob | Dec. 13, 1955 |
| 2,745,874 | Schetty et al. | May 15, 1956 |
| 2,811,529 | Bloom | Oct. 29, 1957 |